United States Patent [19]

Conner et al.

[11] Patent Number: 5,032,431
[45] Date of Patent: Jul. 16, 1991

[54] GLASS FIBER INSULATION BINDER

[75] Inventors: Rodney R. Conner, Tacoma; Mary L. Foster, Federal Way, both of Wash.

[73] Assignee: Georgia-Pacific Resins, Inc., Atlanta, Ga.

[21] Appl. No.: 475,986

[22] Filed: Feb. 6, 1990

[51] Int. Cl.$^5$ ............................ B05D 3/02; C08J 5/08; C08J 3/20; C08K 3/38
[52] U.S. Cl. .................................. 427/389.8; 524/262; 524/404; 524/405; 524/494; 524/591; 524/594; 524/595; 524/841; 525/506; 528/138
[58] Field of Search ................ 524/841, 591, 404, 405, 524/262, 494, 595, 594; 525/506; 528/138; 427/389.8

[56] References Cited

U.S. PATENT DOCUMENTS

| | | | |
|---|---|---|---|
| 1,999,715 | 4/1935 | Billings et al. | 524/405 |
| 2,748,101 | 5/1956 | Shappell | 524/405 |
| 2,941,904 | 6/1960 | Stalego | 523/508 |
| 2,990,307 | 6/1961 | Stalego | 525/497 |
| 3,510,446 | 6/1970 | Junger et al. | 524/450 |
| 3,839,236 | 10/1974 | Foley et al. | 528/138 |
| 3,846,225 | 11/1974 | Stalego | 427/221 |
| 3,945,962 | 3/1976 | Clark | 524/405 |
| 4,122,045 | 10/1978 | Garrett et al. | 521/103 |
| 4,123,414 | 10/1978 | Milette | 528/140 |
| 4,176,105 | 11/1979 | Miedaner | 525/504 |
| 4,195,458 | 4/1980 | Hoppe et al. | 524/594 |
| 4,272,403 | 6/1981 | Meyer et al. | 524/595 |
| 4,323,667 | 4/1982 | Meyer et al. | 528/138 |
| 4,584,329 | 4/1986 | Gardziella et al. | 524/404 |
| 4,820,571 | 4/1989 | Duryea et al. | 528/138 |
| 4,824,896 | 4/1989 | Clarke et al. | 524/405 |

FOREIGN PATENT DOCUMENTS 912721  10/1972  Canada ............................... 524/841

OTHER PUBLICATIONS

The Chemistry and Uses of Fire Retardants by John W. Lyons, 1970, John Wiley & Sons, pp. 80–84.
Chem. Abs. 81(24):153931b.
Chem. Abs. 81(6):27526k.
Chem. Abs. 73(4):15919n.
Chem. Abs. 104(4):20140q.
Chem. Abs. 85(2):7528s.

Primary Examiner—Earl Nielsen
Assistant Examiner—Kathryne E. Shelborne
Attorney, Agent, or Firm—Banner, Birch, McKie and Beckett

[57] ABSTRACT

A dark colored glass fiber insulation having improved moisture tolerance prepared using an aqueous phenolic resole resin composition containing a water soluble borate and cured under alkaline conditions.

20 Claims, No Drawings

GLASS FIBER INSULATION BINDER

BACKGROUND OF THE INVENTION

1. Field of the Invention

This invention relates to a phenolic resin composition useful for preparing a glass fiber insulation of improved moisture resistance. The present invention particularly relates to a resole-type phenolic resin containing a borate salt which is useful for preparing a dark colored insulation binder for glass fibers and to the glass fiber insulation containing the cured resin.

2. Description of Related Art

Phenolic resins have long been employed as binders for use with glass fibers in the preparation of insulation products. Historically, such resins have been prepared by reacting a molar excess of formaldehyde with phenol in the presence of a basic catalyst, such as sodium hydroxide. Such alkaline adducts are referred to in the art as phenolic resole resins. When preparing a binder for glass fiber insulation, such resole resins typically are neutralized after their preparation and then mixed with an acidic curative, such as ammonium sulfate, a formaldehyde scavenger, such as ammonia, a silane coupling agent, other diluents such as urea and lignin, and if necessary additional water.

Glass fibers are coated with the aqueous binder solution, usually by spraying, and passed through an oven where they are compressed to the desired thickness and density, and then permanently fixed by heat setting or curing the resin binder. Acid cure has been favored in the art because it produces a glass fiber insulation having good strength characteristics.

More recently, a need has developed in the glass fiber insulation art for binders that produce a dark color when cured. Acid cured phenolic resole resins are relatively light-colored, so carbon black generally has been added to the binder formulation to achieve the necessary coloration. Using carbon black as an additive, however, creates significant handling problems, and thus makes this approach less than desirable.

Alkaline-cured resole resins, unlike their acid-cured counterparts, develop a very dark color through an oxidation reaction upon curing. Alkaline-cured phenolic resole resins also do not emit the strong amine odor associated with resole resins cured with an acid curative such as ammonium sulfate. Unfortunately, alkaline cured phenolic resole resins are rather brittle and thus do not yield binder strengths on a par with acid-cured resins. Glass fiber insulation prepared by curing a phenolic resole resin under alkaline conditions has a low moisture resistance and loses considerable strength when manufactured and/or stored under conditions of high humidity.

The present invention is based on the discovery that the addition of a proper amount of a water-soluble borate salt to a phenolic resole resin having the proper alkalinity significantly improves its moisture resistance after alkaline cure. Thus, the present invention allows the production of a dark colored glass fiber insulation without the need for carbon black and without sacrificing binding strength.

DISCLOSURE OF THE INVENTION

The present invention is directed to a resole resin composition useful for preparing a binder for glass fiber insulation, to a glass fiber binder made using the resole resin composition, and to a dark colored glass fiber insulation made using the binder.

The phenolic resole resin composition of the present invention comprises an aqueous mixture of:
(a) a product formed by reacting phenol with formaldehyde in the presence of an alkaline catalyst at a mole ratio of formaldehyde to phenol ranging from about 1.1/1 to about 4/1, and
(b) a water-soluble borate, wherein said composition contains at least about 0.05 mol of alkaline catalyst per mol of phenol, has a pH above about 8.5 and contains between about 0.02 and about 0.3 mol borate per mol of phenol.

A glass fiber insulation binder according to the present invention comprises a mixture of the above-described phenolic resole resin composition with a silane coupling agent, said mixture having a pH above 8.5.

The present invention also relates to a method of making a dark colored glass fiber insulation which comprises:

(1) coating glass fibers with an aqueous binder having a pH above 8.5 comprising an aqueous mixture of:
  (i) a product formed by reacting phenol with formaldehyde in the presence of an alkaline catalyst at an mol ratio of formaldehyde to phenol ranging from about 1.1/1 to about 4/1,
  (ii) a water soluble borate, and
  (iii) a silane coupling agent, wherein said aqueous mixture contains at least about 0.05 mol of alkaline catalyst per mol of phenol, has a pH above 8.5 and contains between about 0.02 and about 0.3 mol of borate per mol of phenol, and (2) heating said glass fibers to cure said binder.

The present invention further relates to a glass fiber insulation made in accordance with this method.

The phenolic resole resin of the present invention is prepared by reacting a molar excess of formaldehyde with phenol under alkaline reaction conditions. Formaldehyde is used in an amount of between about 1.1 and about 4.0 mols per mol of phenol. More preferably, 1.2 to 3.5 mols of formaldehyde per mol of phenol, and most preferably 1.3 to 2.5 mols per mol, is used.

Alkaline reaction conditions are established by adding an alkaline catalyst to an aqueous solution of the phenol and formaldehyde reactants. During the initial reaction of the phenol and formaldehyde, only that amount of alkaline catalyst necessary to produce a resole resin need be added to the reaction mixture. Suitable amounts of an alkaline catalyst are known to those skilled in the art. Typically, at least about 0.05 mol of alkaline catalyst per mol of phenol is used, with an amount between about 0.1 and 0.3 mol per mol being more usual. Normally, the catalyst is added incrementally to the reaction mixture in two or more portions, although the complete amount can be added when initiating the reaction.

Alkaline catalysts normally used for preparing phenolic resole resins also can be used in accordance with the present invention. Typical alkaline catalysts include alkali metal hydroxides such as lithium hydroxide, sodium hydroxide and potassium hydroxide; alkali metal carbonates such as sodium carbonate and potassium carbonate; and tertiary amines. Based on considerations of cost and availability, sodium hydroxide is used most often.

The formaldehyde reactant is added to the condensation reaction usually as an aqueous solution containing from about 30 to about 55 weight percent or more of formaldehyde, or in a polymeric form such as paraformaldehyde. It is to be understood that formaldehyde may also be added to the reaction in the form of other substances capable of providing free formaldehyde under the conditions described herein. The full complement of the formaldehyde source can be present at the start of the reaction or it can be added incrementally or metered into the reaction mixture during the course of the reaction.

Although the composition of the invention is defined in terms of formaldehyde and the use of formaldehyde is preferred, it is well known in the art that other aldehydes such as acetaldehyde, glyoxal, propionic aldehyde, butylaldehyde and furfural can be substituted for formaldehyde in phenol-formaldehyde resole resins. The use of other aldehydes is, therefore, contemplated for use in preparing compositions of the present invention.

The phenols suitable for use in the invention are phenol per se or substituted phenols or mixtures thereof. Preferably the mixtures contain phenol. Suitable phenols can be represented by the formula.

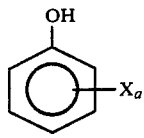

where X is a monovalent radical such as an alkyl, cycloalkyl, aryl, alkaryl, aralkyl, alkoxy, halogen and the like and a is from 0 to 3, and wherein at least two of the ortho- and para-positions relative to the hydroxy group are free. Preferably a para-position should be free. Most preferably the substituents should be in the meta-positions only, leaving the ortho- and para-positions free. Examples of suitable substituted phenols are cresol, isopropylphenols, nonylphenols or dihydric phenols, such as bis-phenol F, hydroquinone and resorcinol. Use of substituted phenols will tend to alter the properties of any resulting phenolic resin which is derived from the resulting product, such property changes being of the kind which allows for a maximum variety of phenolic resin product types. For example, a halogen substitution should enhance the flame retardancy of the resultant phenolic resin.

The reaction is carried out at a temperature of from about 30° C. to 100° C. Preferably, the temperature is controlled within the range of about 45° C. to 75° C. Any method known to those skilled in the art for controlling the temperature can be used such as direct cooling using cooling coils immersed in the reaction mixture, indirect cooling using a jacketed reactor, or by conducting the reaction at reflux under a vacuum. The reaction time normally will be between about one (1) and six (6) hours.

The phenol/formaldehyde reaction product is an aqueous mixture. The water content thereof generally ranges from about 10 to about 65 weight percent, and is usually no more than about 40 to about 60 weight percent. Water may be introduced to the system with the formaldehyde, which is usually added as an aqueous solution, or with the catalyst which, in the case of alkali metal hydroxides, is usually added as a preformed aqueous solution. Varying amounts of water also may be formed as a by-product during the reaction. Concentrating the liquid resin product to a particular predetermined water content is readily accomplished by conventional stripping at reduced pressure such as, for example, at a reduced absolute pressure from about one to about 200 mm mercury, absolute and at temperatures from about 30° to about 75° C.

The specific nature of the resulting resole resin, such as its molecular weight, is not narrowly critical. Normally, what is preferred in terms of resin viscosity and the like depends to some extent on the process used to make the glass fiber insulation product. For example, the resole preparation reaction can be controlled to produce primarily monomeric methylol phenols, with small amounts of dimeric and trimeric methylol species. Alternatively, the reaction can be continued until a resin with an average molecular weight of 1000 or more is obtained.

Once the reaction is completed to the extent desired, a water soluble borate salt is added to the aqueous resole resin. The borate is added in an amount between about 0.02 and about 0.3 mol of water soluble borate per mol of phenol, and preferably between about 0.05 and about 0.2 mol per mol. Suitable water soluble borates include lithium metaborate ($LiBO_2$), sodium metaborate ($NaBO_2$), and potassium metaborate ($KBO_2$).

It also is possible to form the necessary borate salt in situ by reacting boric acid ($H_3BO_3$) or borax ($Na_2B_4O_7 \cdot 10 H_2O$) with an alkali metal hydroxide such as sodium hydroxide. Neutralizing each mol of boric acid requires one mol of alkali metal hydroxide, while neutralizing each mol of borax requires two mols of hydroxide to form the metaborate salts. It must be remembered that the hydroxide needed to neutralize the borate source is in addition to that needed to maintain alkaline conditions in the phenolic resole resin composition.

Additional alkaline catalyst also may be added to the resin at this time. Taking into account the alkaline catalyst added during the phenol-formaldehyde reaction and any added subsequent to the reaction (excluding any added to neutralize an acidic borate source), the resulting resin should contain at least about 0.05 mol of alkaline catalyst per mol of phenol. Usually, no more than about 0.6 mol of catalyst per mol of phenol should be added. Preferably, between about 0.1 and about 0.3 mol of catalyst per mol of phenol is used. After addition of the borate salt and any additional alkaline catalyst, the pH of the aqueous phenolic resin composition will be at least about 8.5. Typically, the pH of the resin composition will be between 8.5 and 12.5, and usually will be between 9.0 and 12.0.

The resulting resole resin composition is suitable for preparing an aqueous binder for making glass fiber insulation. To prepare the binder, a silane coupling agent (organo silicon oil) is added to the resole resin composition in an amount of at least about 0.05 wt. % based on the weight of binder solids. Suitable silane coupling agents (organo silicon oils and fluids) are marketed by the Dow-Corning Corporation, Union Carbide Corporation, Petrarch Systems, and by the General Electric Company. Their formulation and manufacture are well known such that detailed description thereof need not be given. When employed in the binder composition of this invention, the silane coupling agents typically are present in an amount within the range of about 0.1 to about 2.0 percent by weight based upon the binder solids and preferably in an amount within the range of 0.1 to 0.5 percent by weight. Representative of silane coupling agents are the organo silicon oils marketed by Dow-Corning Corporation; A0700, A0750 and A0800 marketed by Petrarch Systems and A1100 (an amino propyl, trimethoxy silane) or A1160 marketed by Union Carbide Corporation.

The binder is prepared by combining the phenolic resole resin composition and the silane coupling agent in a relatively easy mixing procedure carried out at ambient temperatures. The binder can be used immediately and may be diluted with water to a concentration suitable for the desired method of application, such as by spraying onto the glass fibers.

Other conventional binder additives compatible with the resole resin composition and silane coupling agent may be added to the binder. Such additives include formaldehyde scavengers, such as ammonia.

The binder composition of this invention may comprise a variety of liquid forms, including solutions, miscible liquids, or dispersions and the like and combinations of such liquid forms depending upon the optional ingredients blended into the binder composition. Where the term solution or any of the variations thereof is used herein it is intended to include any relatively stable liquid phase.

The method for forming glass fibers for use in the present invention is relatively unimportant. Use can be made of discontinuous or staple glass fibers such as are formed by the rapid attenuation of multiple streams of molten glass by high pressure streams of air or steam directed angularly downwardly onto the streams of molten glass flowing therebetween. Use can be made of continuous or textile fibers such as are formed by the rapid attenuation of molten streams of glass. Continuous glass fibers may be employed in the form of mats fabricated by swirling the endless filaments or strands of continuous fibers, or they may be chopped or cut to shorter lengths for mat or batt formation. Use can also be made of ultra-fine fibers formed by the attenuation of glass rods. Also, such fibers may be treated with a size, anchoring agent or other modifying agent before use.

The binder can be applied to the glass fibers by flooding the collected mat of glass fibers and draining off the excess, by applying the binder composition onto the glass fibers during mat formation, by spraying the glass fiber mat or the like. The layer of fiber with binder is then compressed and shaped into the form and dimensions of the desired insulating product such as pipe, batt or board and passed through a curing oven where the binder is cured, thus fixing the size and shape of the finished insulating product by bonding the mass of fibers one to another and forming an integral composite structure. For cure, the mass is heated to a temperature in excess of 350° F. and preferably within the range of 400°-650° F. for a time sufficient to cure the components. The glass fiber component will represent the principal material of the glass insulation product. Usually 99-60 percent by weight of the product will be composed of the glass fibers while the amount of binder will be in reverse proportion ranging from 1-40 percent, depending upon the density and character of the product. Glass insulations having a density less than one pound per cubic foot may be formed with binders present in the lower range of concentrations while molded or compressed products having a density as high as 30-40 pounds per cubic foot can be fabricated of systems embodying the binder composition in the higher proportion of the described range.

Glass fiber insulation can be formed as a relatively thin product of about 0.25 to 1.5 inch or it can be a thick mat of 12 to 14 inches or more. The time and temperature for cure will depend in part on the amount of binder in the final structure and the thickness and density of the structure that is formed. For a structure having a thickness ranging from 0.25 to 1.5 inch, a cure time ranging from 1-5 minutes will be sufficient at a cure temperature within the range of 400°-600° F.

EXAMPLE A

Resole Resin Preparation

A reactor equipped with a mixer, reflux condenser and means for establishing a vacuum is charged with phenol and formaldehyde in a molar ratio (F/P) of 1.85. Formaldehyde is added as a 50 wt. % aqueous solution. Sodium hydroxide in an amount of about 0.1 mol per mol of phenol (caustic) is then added slowly to the reactor while maintaining its contents under a condition of vacuum reflux at about 55° C. Once the caustic addition is completed, the reaction mass is heated slowly to about 68° C. over about 40 minutes. The reaction then is continued at 68° C. for up to about 230 minutes. The resin then is cooled rapidly to 55° C. and maintained at that temperature while adding an additional 0.13 mol of sodium hydroxide per mol of phenol. During further cooling 0.09 mol of boric acid per mol of phenol and a small amount of a calcium scavenger, e.g., oxalic acid, also are added to the resin. The added boric acid reacts with its stoichiometric portion of the additional sodium hydroxide to produce in situ 0.09 mol of sodium borate per mol of phenol. The resulting aqueous resole resin thus contains 0.14 mol of alkaline catalyst and 0.09 mol of borate per mol of phenol, has a solids content of about 56% by weight, a pH of about 9.3 and a Brookfield viscosity of about 100–160 cps.

EXAMPLE B

Comparison Resole Resin Preparation

A prior art resole resin composition was made in much the same manner as the resole resin of Example 1, except that the additional sodium hydroxide and boric acid added during resin cooling was not employed. The resulting aqueous resole resin composition contains 0.1 mol of alkaline catalyst per mol of phenol, has a solids content of about 56% by weight, a pH of about 9.0 and a Brookfield viscosity of about 50–85 cps.

EXAMPLE C

Binder Preparation

Binders were formulated to produce 1200 gms of solution, enough binder to prepare four hand sheets. Each solution contained 240 gms resin solids, 1.2 gm of Union Carbide A1160 silane coupling agent and 30 gms 27% aqueous ammonia. Addition of other components, i.e. sodium borate and free sodium hydroxide was based on the resin solids, 24 gms being equivalent to 10%. In the case of borate modification, 5% sodium borate (sodium meta borate—$NaBO_2$) would mean the addition 12.0 gm $NaBO_2$ or the neutralization of 11.3 g. boric acid $H_3BO_3$ with 7.3 g sodium hydroxide. Binders made with borate addition were made in accordance with the method of Example A by using the appropriate amount of alkaline catalyst and substituting the required amount of the borate source.

EXAMPLES 1-20

A fiber glass substrate was made from one-half inch chopped strand fiber glass (PPG Industries Inc. M-2035). An 8.1 gm sample of fiber glass was dispersed in water, the slurry was transferred to a standard 12 by 12 inch$^2$ sheet mold and the sheet formed. This glass mat sheet was suction dried, saturated with binder solution and suction dried a second time. The sheet was then cured at a temperature of 210° C. for three minutes. The cured sheet was trimmed to an 11×11 inch$^2$ sheet from which seven samples are cut, four samples being 5.5×3 inch$^2$ and three samples 5×3 inch$^2$.

Four sheets were prepared from each binder being tested. Two sheets (14 samples) were tested for dry tensile strength and two sheets were tested after their samples had been soaked in 85° C. water for ten minutes, for hot wet tensiles. All tensiles were measured on an Instron Model 1122 testing machine using a sample length of three inches, a width of three inches and a crosshead speed of two inches/minute. The results for binders formulated with different levels of alkalinity and different levels of borate addition are shown in the table below. The weight percent of sodium hydroxide reported in the table constitutes the weight of alkaline catalyst in the binder solution per hundred parts of resin solids.

TABLE

| Example | NaBo$_2$ (wt. %) | NaOH (wt. %) | Strengths Tensile (lbs.) Dry | Strengths Tensile (lbs.) Wet | Strength Ratio Wet/Dry |
|---|---|---|---|---|---|
| 1 | 0 | 3.3 | 78.5 | 36.7 | 0.47 |
| 2 | 2.5 | 2.9 | 100.6 | 69.7 | 0.69 |
| 3 | 3.8 | 3.3 | 95.9 | 68.7 | 0.72 |
| 4 | 3.8 | 4.3 | 94.9 | 66.8 | 0.70 |
| 5 | 3.8 | 5.3 | 89.9 | 71.6 | 0.80 |
| 6 | 3.8 | 8.3 | 97.7 | 72.1 | 0.74 |
| 7 | 5 | 2.9 | 101.7 | 80.1 | 0.79 |
| 8 | 5 | 2.9 | 98.8 | 80.6 | 0.82 |
| 9 | 5 | 2.9 | 103.7 | 86.0 | 0.83 |
| 10 | 5 | 3.9 | 103.2 | 79.1 | 0.77 |
| 11 | 5 | 3.9 | 98.7 | 78.1 | 0.79 |
| 12 | 5 | 4.3 | 101.9 | 80.6 | 0.79 |
| 13 | 5 | 4.9 | 101.3 | 82.8 | 0.82 |
| 14 | 7.5 | 3.9 | 103.8 | 89.5 | 0.86 |
| 15 | 7.5 | 5.3 | 99.8 | 72.4 | 0.73 |
| 16 | 7.5 | 7.3 | 111.6 | 60.4 | 0.54 |
| 17 | 10 | 0 | 85.4 | 16.5 | 0.19 |
| 18 | 10 | 2.9 | 105.8 | 64.7 | 0.61 |
| 19 | 10 | 7.3 | 83.0 | 0 | 0 |
| 20 | 15 | 2.9 | 49.7 | 0 | 0 |

In the above table, 3.3 weight percent of sodium hydroxide corresponds to 0.1 mol per mol of phenol; while 3.8 weight percent sodium borate corresponds to 0.09 mol per mol of phenol.

Although the invention has been described in its preferred forms with a certain degree of particularity, it is understood form has been made only by way of example and that numerous changes may be made without departing from the spirit and the scope of the invention.

We claim:

1. A phenolic resole resin composition useful in a glass fiber insulation binder which consists essentially of an aqueous mixture of:
   (a) a product formed by reacting phenol with formaldehyde in the presence of an alkaline catalyst at a mol ratio of formaldehyde to phenol ranging from about 1.1/1 to about 4/1, and
   (b) a water-soluble borate, wherein said composition contains at least about 0.05 mol of alkaline catalyst per mol of phenol, has a pH above 8.5 and contains between 0.02 and about 0.3 mol of borate per mol of phenol.

2. A glass fiber insulation binder which comprises an aqueous mixture of:
   (a) a product formed by reacting phenol with formaldehyde in the presence of an alkaline catalyst at a mol ratio of formaldehyde to phenol ranging from about 1.1/1 to about 4/1,
   (b) a water-soluble borate, and
   (c) a silane coupling agent,
   wherein said mixture contains at least about 0.05 mol of alkaline catalyst per mol of phenol, has a pH above 8.5 and contains between about 0.02 and about 0.3 mol of borate per mol of phenol.

3. A method of making a dark colored glass fiber insulation which comprises:
   (1) coating glass fibers with an aqueous binder having a pH above 8.5, comprising an aqueous mixture of:
      (i) a product formed by reacting phenol with formaldehyde in the presence of an alkaline catalyst at a mol ratio of formaldehyde to phenol ranging from about 1.1/1 to about 4/1,
      (ii) a water soluble borate, and
      (iii) a silane coupling agent, wherein said aqueous mixture contains at least about 0.05 mol of alkaline catalyst per mol of phenol, and between about 0.02 and about 0.3 mol of borate per mol of phenol, and
   (2) heating said glass fibers to cure said binder.

4. A dark colored glass fiber insulation made in accordance with the method of claim 3.

5. A phenolic resole resin according to claim 1 containing between about 0.1 and about 0.3 mol of alkaline catalyst per mol of phenol.

6. A phenolic resole resin according to claim 5 containing between about 0.05 and about 0.2 mol of borate per mol of phenol.

7. A phenolic resole resin according to claim 6 wherein said water soluble borate is sodium metaborate.

8. A glass fiber binder according to claim 2 containing between about 0.1 and about 0.3 mol of alkaline catalyst per mol of phenol.

9. A glass fiber binder according to claim 8 containing between about 0.05 and about 0.2 mol of borate per mole of phenol.

10. A glass fiber binding according to claim 9 wherein said water soluble borate is sodium metaborate.

11. A glass fiber binder according to claim 2 containing about 0.1 to about 2.0 weight percent silane coupling agent.

12. A glass fiber binder according to claim 9 containing about 0.1 to about 2.0 weight percent silane coupling agent.

13. A method of making a dark colored glass fiber insulation according to claim 3 wherein said mixture contains between about 0.1 and about 0.3 mol of alkaline catalyst per mol of phenol.

14. A method of making a dark colored glass fiber insulation according to claim 13, wherein said mixture contains between about 0.05 and about 0.2 mol of borate per mole of phenol.

15. A method of making a dark colored glass fiber insulation according to claim 14 wherein said water soluble borate is sodium metaborate.

16. A method of making a dark colored glass fiber insulation according to claim 3 wherein said mixture contains about 0.1 to about 2.0 weight percent silane coupling agent.

17. A method of making a dark colored glass fiber insulation according to claim 14 wherein said mixture contains about 0.1 to about 2.0 weight percent silane coupling agent.

18. A method in accordance with claim 3, wherein said glass fibers are coated with an amount of said aqueous binder to provide a glass fiber insulation having about 1 to about 40 percent by weight binder and about 99 to about 60 percent by weight glass fiber.

19. A method in accordance with claim 16, wherein said glass fibers are coated with an amount of said aqueous binder to provide a glass fiber insulation having about 1 to about 40 percent by weight binder and about 99 to about 60 percent by weight glass fiber.

20. A method in accordance with claim 17, wherein said glass fibers are coated with an amount of said aqueous binder to provide a glass fiber insulation having about 1 to about 40 percent by weight binder and about 99 to about 60 percent by weight glass fiber.

* * * * *